Figure 1:
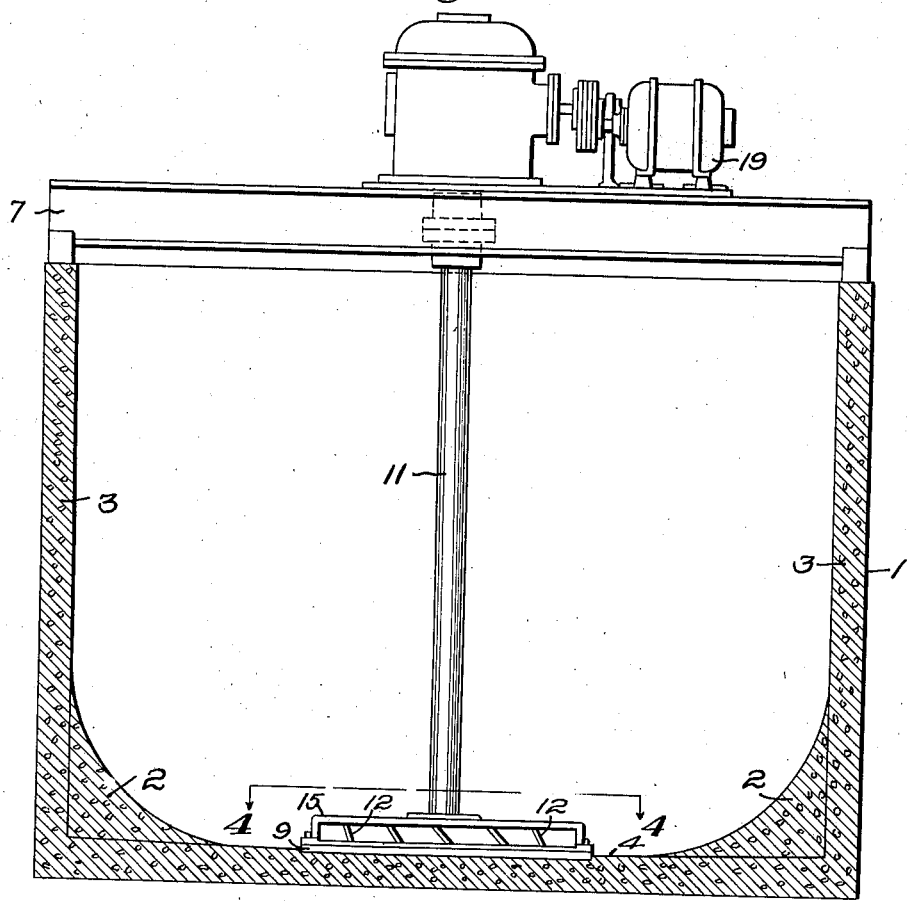

June 4, 1940.  W. O. CHACE  2,203,404
AGITATING AND COMMINUTING MECHANISM
Filed June 6, 1939  2 Sheets-Sheet 1

Inventor:
Warren O. Chace,
by Emery Booth Townsend Miller Widmer
Attys

June 4, 1940.  W. O. CHACE  2,203,404
AGITATING AND COMMINUTING MECHANISM
Filed June 6, 1939   2 Sheets-Sheet 2
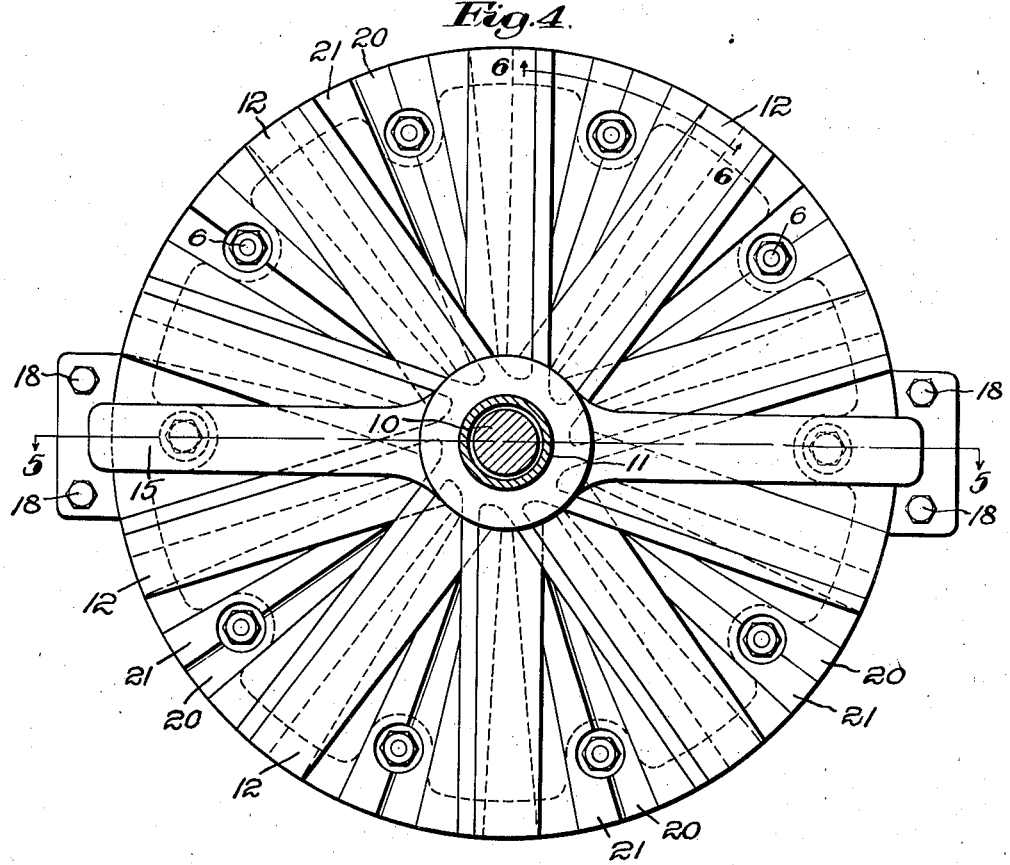
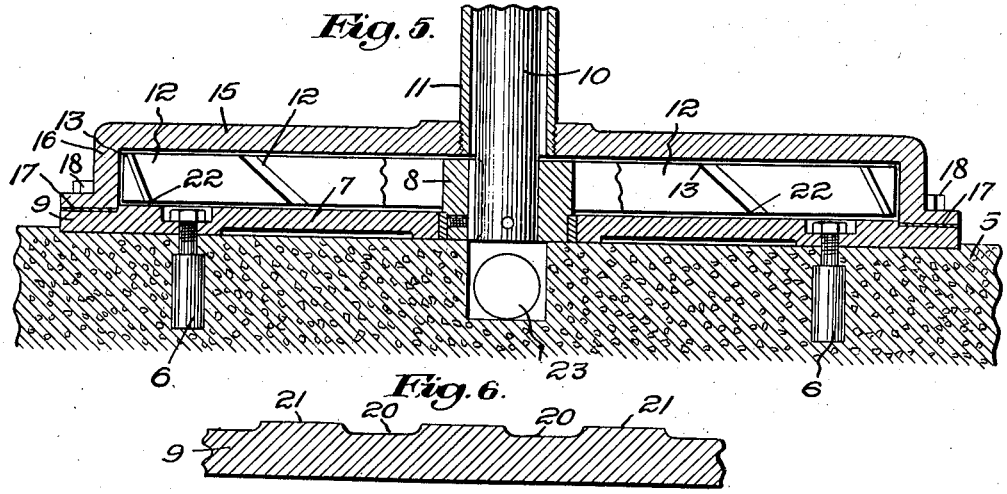
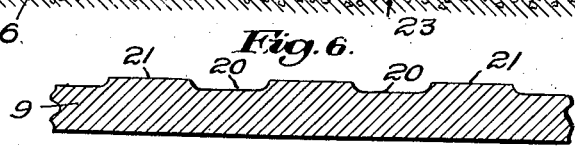
Inventor:
Warren O. Chace,
Attys Patented June 4, 1940

2,203,404

UNITED STATES PATENT OFFICE 2,203,404

AGITATING AND COMMINUTING MECHANISM

Warren O. Chace, Medford, Mass.

Application June 6, 1939, Serial No. 277,654

3 Claims. (Cl. 146—68)

This invention relates to agitating, stirring, crushing and cutting machines, and is particularly adapted for use in agitating and cutting plant or vegetal growth, especially the preparation of certain fresh and salt water plants or vegetation, such, for instance, as kelp and similar growth, to separate and obtain from the vines or plants the desired various constituent elements and products therein contained.

For a long period, certain varieties of seaweed or water vegetation, and more especially that variety or species known as algae, have been known to be an almost inexhaustible, and, so far as initial cost of the material is concerned, relatively inexpensive source of supply of vegetable gelatine, with possibly great commercial advantages.

The major problem heretofore has been to find a reasonably inexpensive means or method to separate the gelatinous pulp from the cellulose fibers, and produce a gelatinous product of necessary purity, and which, after subsequent treatment to remove certain additional undesired but possibly valuable by-products, could be carried out at a cost that would be attractive to those requiring such material.

Immense quantities of algae exist in most seashore regions, and the algae will, properly treated, yield great quantities of gelatine, as well as some iodine, bromine and certain proteins; and the particular embodiment of my invention described and illustrated herein was designed, and has been found to be very valuable and successful, for the recovery from algae and the like vegetation of gelatine for food and other products, under the conditions above recited, in the only successful commercial plant known to me.

Figure 2:
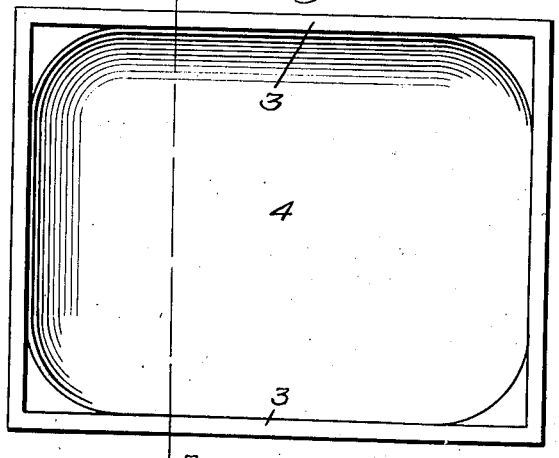
Figure 3:
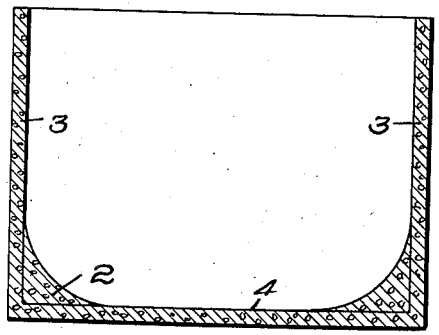

In the drawings of an embodiment of my invention selected for illustration and description:

Fig. 1 is a vertical section through a suitable agitating tank 1, for the vegetable growth, with the agitating means therein;

Fig. 2, a plan of the tank with the machinery removed, and on a reduced scale;

Fig. 3, a vertical cross section on the line 3—3, Fig. 2, looking to the left;

Fig. 4, a plan and partial section of the rotor, or the agitating and crushing member, on the line 4—4, Fig. 1;

Fig. 5, a vertical section on the line 5—5, Fig. 4, showing the agitating and crushing members; and Fig. 6, a partial, vertical section, on an enlarged scale, of the crusher plate, on the line 6—6, Fig. 4.

The first, and probably the most important step in the preparation of the raw material, and which has not heretofore been satisfactorily accomplished economically and expeditiously, is the mechanical one of treatment of the plant structure to release the cellulose fibrous portion, which is a relatively small part of the whole, from the gelatinous mass associated with it.

Other substances, as stated, such as iodine in substantial quantities, bromines and proteins, must be released later on from the gelatinous mass. The plants vary exceedingly in form and size, from a single microscopic, or, sometimes, large and branching cell, a shapeless jelly-like mass, or mere string of articulations, to forms with a trunk-like stems many feet in length. Owing to the great diversity in size and shape of the plants, they have presented a serious mechanical problem for reduction to a condition for further treatment.

Many machines for reducing these plants to a homogeneous, semi-liquid mass, from which the fibers could be removed, have been built, but without success. I have discovered that it is necessary, however, in proceeding, for reasons both financial and mechanical, that the cellulose fiber be not macerated or ground too finely into a pulp with the gelatinous mass, but that it must be left of such size as will permit its separation expeditiously from the pulp about it, as the difficulty of removing the fiber from the gelatinous mass is greatly increased as it is broken or macerated into small sizes or lengths.

It is apparently very difficult to construct an agitating member with teeth, knives or cutting members, all of one type, that will successfully reduce practically all the plant structure to the desired degree of semi-liquidity, without reducing the cellulose fibers to units of a size so small that a large part of them cannot be separated from the pulpy mass, afterward.

Therefore, contrary to the practice heretofore followed, and unsuccessfully, it is my aim to quickly separate, by a simultaneous two-type reduction operation, primarily mechanically, but simultaneously assisted by a suitable softening agent, the fibers from the pulp, and avoid, so far as possible in so doing, any physical changes in the size or condition of the broken down fibers, such as flow from too fine grinding.

Experience suggests, however, that there may be a limit to both the longitudinal and diametrical measurements of vegetal growth units that can be commercially, profitably, readily and initially treated by an embodiment of my invention of reasonably and economically usable size, without previously reducing the growth units in size, or to a coarse pulp, for further treatment by my novel agitator.

In order that the work may be accomplished at a cost in time and financial outlay that will make it practicable commercially, it is desirable, if not essential, that the algae or gelatinous natural pulp at the same time be reduced to a softer, jelly-like, more liquid, or semi-liquid, paste, completely homogeneous, which condition is essential to the subsequent removal of impurities. My invention is, therefore, directed largely to this particular end.

Referring first to Figs. 1, 2, 3, a suitable tank 1, of any shape, may be of any size, but the one illustrated, described and in use, holds twelve tons of algae, which is thrown into it as received at the plant, the coarse gravel and any large stones having been preferably removed as by washing, and which plant obviously is most conveniently located near the supply. Sufficient water is then added to flood or cover the kelp or algae.

The tank may be of any suitable material, wood, metal or cement, preferably the latter, with fillets 2 at the joints of the walls 3 and the walls and base 4, to facilitate the feeding of the algae to the agitator from all directions simultaneously, and in general, equally. The tank is preferably set upon a suitable base 5, Fig. 5, as cement, secured as by bolts 6.

I have found that the beating or rapidly repeated cutting action of two or more sets of cutting elements produces the colloidal resulting mass I desire to avoid. On the other hand, a crushing action, alone, upon the algae results in not only separating the fibers and pulp, but also in tearing the fibers into small or short pieces. Accordingly, I have provided an agitator equipped with multiple reducing elements of different degrees of cutting efficiency, or different types, whereby any plant stems that escape the cutting elements are practically certain to encounter the other reducing and crushing elements with desired results.

Mounted in a suitable bearing, not shown, Fig. 1, on a bar 7 or other suitable support at the top of the tank, and also in a bearing 8 in the crusher plate 9, Fig. 2, to be referred to later, at the bottom of the tank, is a rotor shaft 10, which is preferably enclosed in a tube 11, to avoid frictional contact with the mass of material being treated, and also to prevent accidental contact of any grease from either rotor bearing, with the material.

At the lower end, the rotor shaft is provided with a series of agitating and cutting arms 12, angularly mounted on the shaft 10, and the upper edges 13 of which are sharpened, thus presenting to the material mass thereabout a series of sharp cutting upper edges 13 in suitable relation for cooperating stem reducing action with the lower edges 14 of a reducing bar 15, the downwardly turned ends 16 of which are adjustably secured by means of shims 17, or the like, and bolts 18, to the plate 9. Any suitable means, obviously, may be used as a driving agency for the shaft, as a motor 19, Fig. 1.

In this manner, the material which is, when wet, slippery and pliable, is first kept moving circumferentially, and eventually most stalks or stems are caught between one of the agitating bar edges 13, and the edge 14 of the bar 15, and are broken or severed into units of reduced length, and thus are largely prevented from becoming wedged between the bar and cutter arms 12, and are forced to undergo the treatment desired by the means provided.

As a multiple and cooperating reducing element, I have provided that the plate 9 be divided circumferentially, Figs. 4, 6, into a series of practically non-cutting, but breaking, radial valley and hill triangular sections 20, 21, respectively, preferably in alternate relation, the better to act upon the mass of algae or other plants in the desired manner, and for the hills and valleys to cooperate, in the reducing and disintegrating action, without substantial cutting, but rather breaking or crushing, action of the lower edges 22 of the agitating cutting bars 12 upon the previously reduced stem units, and upon such of the pieces of stems as escaped reducing by the first reducing elements 12.

In operation, within a few minutes after starting the machine, the kelp stems have been so reduced to pieces of desired length by the arms 12 and bar 15 that few pieces of the plants remain larger than ½ cubic inch in size, which, experience teaches, is substantially the smallest size from which the fibers after treatment by the second reducing action can most satisfactorily be removed. At once, there is added a hot solution of soda ash, or similar material, in desired quantity, to soften or macerate the pulp about the cellulose fiber, while the machine is in operation, and the result is that the kelp, and water, which is added in suitable quantities as necessary, shortly become an homogeneous paste, and resulting in doing, in one operation, what has previously required two operations; because heretofore it has been customary, so far as I am informed, to apply the soda ash in dry form to the kelp, and then add the required water and allow it to remain in the soaking vat from eight to twenty-four hours before subjecting the kelp to the stem and fiber reducing action. The resulting paste above described is then further treated and purified by suitable steps well known to those skilled in the art, to prepare the gelatine for various uses.

Previously to the use of my mechanical development for performing these two initial stages as one, the operation of releasing the fiber from the pulp has been undertaken and accomplished with the use of several devices, some of which have been of the type of equipment known as colloidal mills, and others as described in U. S. Letters Patent No. 1,509,035, which mills have proven to be impracticable, both from the standpoint of cost and the extreme difficulty of the removal of cellulose fiber, because the action of the mill reduces the fibers to such minute particles that their subsequent removal is very difficult and their complete removal almost impossible.

Another variety of the equipment used has been of the general type of the beater engines used in the paper industry, and equipment of this sort has been more successful, so far as the removal or separation of the cellulose fiber from the pulp is concerned, but, from the cost involved, has made the process impracticable from a commercial standpoint. By my novel agitating and crushing machine, which performs the reducing action in two simultaneous steps, one by cutting and the other by crushing the stems while agitating them, I have succeeded in reducing the plant stems to the most practical preliminary size units by the upper cutting arm edges 13, in cooperation with the bar 15, which units subsequently have imparted to them by the angular non-cutting edges 16 in cooperation with the similar hill edges 18 of the plate 19 a crushing and separating action. This action is promoted substantially both as to result and time period by the swirling action set up in the semi-liquid mass by the rotating arms 14 in cooperation with the sloping lower wall portions and bottom portion formed by the fillets 2, whereby a series of swirling currents is created entirely around the rotor and throughout the mass to the extent that the entire mass is brought into contact with the arms 12 and their cooperating plates 15 and 9, with the result that the fibers are released from the pulp in such condition as to size and unitary condition as to be quickly and successfully removable from the gelatinous mass.

The tank may be drained, as by a pipe 23, or any other suitable means.

It will be obvious that my invention is not restricted to the exact form and description thereof disclosed in the illustrative embodiment herein described and set forth in the drawings, but may be modified in many details, without departing from the spirit of the claims, and within the scope thereof.

I claim:

1. Agitating and reducing means for vegetal growth and comprising a tank, a driving shaft mounted therein with plant stem agitating and reducing arms with cutting edges thereon, a reducing bar adjacent said arms to cooperate with said arm upper edges to reduce the plant stems and branches preliminarily into shorter units, a reducing plate below the said arms provided with circumferentially arranged hill and valley sections thereon, cooperating with the reducing arm lower breaking edges to reduce the vegetable stem units to shorter pieces too large to form part of a colloidal mass, but, with the pulp, forming a semi-liquid mass, and fillet surfaces in the upright joints of the walls and the joints of the walls and the tank bottom, promoting feeding of the material from different directions to the reducing arms.

2. Plant growth reducing means comprising a tank, a driving shaft therein with plant stem agitating and reducing arms thereon with cutting upper edges, the bottom of the tank downwardly directed from different portions of the tank and feeding, partly by gravity, the agitated mass to the agitating arms from various directions, a reducing bar adjacent said cutting edges to cooperate therewith to force the plant stems against the upper edges of the agitating arms, and to reduce the plant stems preliminarily into shorter units, a breaking and crushing plate below the said arms with radial V-shaped hill and valley sections to cooperate with the lower arm edges to reduce still further the plant stem units between them to desired length, and form with the pulp a semi-liquid mass.

3. Agitating and reducing means for plant growth comprising a tank having an inclined floor from a plurality of directions toward the center, a driving shaft mounted in said tank with agitating and reducing arms thereon with upper cutting edges, a reducing bar over said arms to cooperate therewith to reduce the plant stems preliminarily into units of shorter length, while forcing said stems against said arms and preventing riding of the stems on said arms, and a stem-crushing plate beneath the arms and with its surface provided with circumferential radially-arranged triangular sections of different surface levels to crush said stem units in pieces of smaller and desired size, the arms cooperating with said inclined floor areas to create a lateral swirling action with a downward flow toward the agitating arms from a plurality of directions, and acting to separate the stems from the pulp.

WARREN O. CHACE.